(12) United States Patent
Bhamidipati et al.

(10) Patent No.: US 12,483,420 B2
(45) Date of Patent: Nov. 25, 2025

(54) SECURE AUTHENTICATION ARTIFACT SIGNING SERVICE FOR AUTHENTICATION SYSTEM

(71) Applicant: Microsoft Technology Licensing, LLC, Redmond, WA (US)

(72) Inventors: Sarvani Kumar Bhamidipati, Snoqualmie, WA (US); Oren Jordan Melzer, Kirkland, WA (US); Victor William Habib Boctor, Bellevue, WA (US); Randeep Singh, Delta (CA)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 715 days.

(21) Appl. No.: 17/732,749

(22) Filed: Apr. 29, 2022

(65) Prior Publication Data
US 2023/0353381 A1 Nov. 2, 2023

(51) Int. Cl.
*H04L 29/06* (2006.01)
*H04L 9/32* (2006.01)

(52) U.S. Cl.
CPC ................ *H04L 9/3247* (2013.01)

(58) Field of Classification Search
CPC .. H04L 9/3247; H04L 2209/76; H04L 9/3213
See application file for complete search history.

(56) References Cited

U.S. PATENT DOCUMENTS

| | | | | |
|---|---|---|---|---|
| 11,321,064 | B1* | 5/2022 | Frey | G06F 21/64 |
| 2010/0146275 | A1* | 6/2010 | Slick | H04L 9/3215 |
| | | | | 713/169 |
| 2010/0299738 | A1* | 11/2010 | Wahl | G06F 21/33 |
| | | | | 713/170 |
| 2011/0231840 | A1* | 9/2011 | Burch | H04L 63/10 |
| | | | | 718/1 |
| 2012/0260322 | A1* | 10/2012 | Logan | G06F 21/33 |
| | | | | 726/6 |
| 2018/0217946 | A1* | 8/2018 | Joshi | G06F 21/00 |
| 2020/0259652 | A1* | 8/2020 | Schmaltz, III | H04L 9/30 |
| 2022/0321345 | A1* | 10/2022 | Ganchev | H04L 63/126 |

* cited by examiner

*Primary Examiner* — Harunur Rashid
(74) *Attorney, Agent, or Firm* — Weaver IP L.L.C.

(57) ABSTRACT

A system for authenticating a principal comprises first and second authentication systems and an authentication artifact signing service. The first authentication system issues a request comprising an authentication artifact associated with the principal and a specification of one or more modifications to be made thereto, the authentication artifact being generated by a second authentication system, signed thereby using a key, and stored by the first authentication system. The signing service receives the request and, responsive thereto: applies the modification(s) to the authentication artifact to generate a modified authentication artifact, signs the modified authentication artifact using a key of the second authentication system, and returns the signed modified authentication artifact to the first authentication system for use in authenticating the principal. The first authentication system executes in a different security domain than the signing service and is unable to access the key used thereby.

20 Claims, 9 Drawing Sheets

SECURE AUTHENTICATION ARTIFACT SIGNING SERVICE FOR AUTHENTICATION SYSTEM

BACKGROUND

Authentication of a principal (e.g., user, application, and/or device) establishes truth of an assertion that an entity is the principal. For instance, such authentication of a principal is often a prerequisite for the principal to gain access to a resource (e.g., server resource) for a designated period of time. Authentication systems typically generate authentication artifacts (e.g., access tokens, identification (ID) tokens, and refresh tokens) that may be used to authenticate principals, and the authentication artifacts may designate the periods of time for which access to the resources is to be granted. During outages of the authentication systems, principals traditionally are not able to authenticate and maintain access to resources after expiration of their previously-received authentication artifacts. For example, an authentication artifact is typically issued in real time when requested by a principal. If an authentication system that possesses an encryption key that is used to issue authentication artifacts encounters an outage for even a moment, any principal that requests an authentication artifact in that moment traditionally will not receive the requested authentication artifact and will therefore be unable to access the resource for which authentication was sought.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system for authenticating a principal is described herein that comprises first and second authentications systems and an authentication artifact signing service. The first authentication system is configured to store an authentication artifact associated with the principal that was generated by a second authentication system and digitally signed thereby using an encryption key. The first authentication system is further configured to issue a request comprising the authentication artifact and a specification of one or more modifications to be made thereto. The authentication artifact signing service is configured to receive the request and, responsive thereto: apply the one or more modifications to the authentication artifact to generate a modified authentication artifact, digitally sign the modified authentication artifact using an encryption key of the second authentication system, and return the digitally signed modified authentication artifact to the first authentication system for use in authenticating the principal. In an embodiment, the first authentication system executes in a different security domain than the authentication artifact signing service and is unable to access the encryption key used thereby.

Further features and advantages of the disclosed embodiments, as well as the structure and operation of various embodiments, are described in detail below with reference to the accompanying drawings. It is noted that the disclosed embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
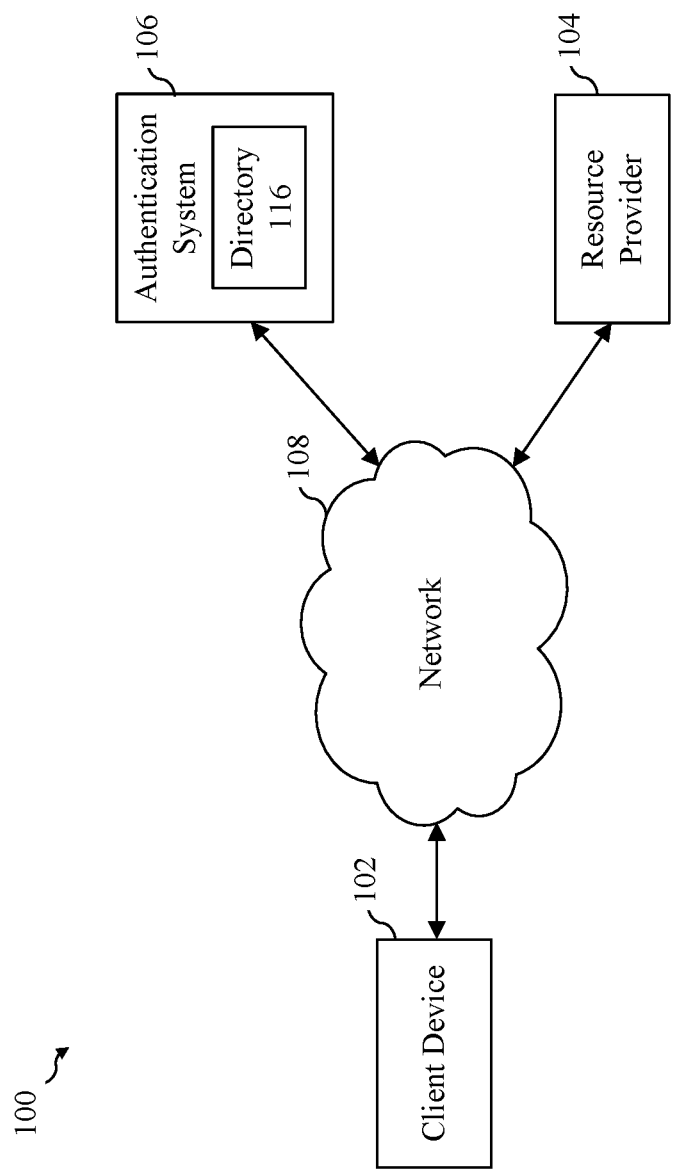
FIG. 1 is a block diagram of a secured access system.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

FIG. 1 is a block diagram of a secured access system 100 that will now be described to introduce certain concepts and to facilitate a better understanding of embodiments that will be described subsequently herein. As shown in FIG. 1, secured access system 100 includes a client device 102, a resource provider 104, an authentication system 106, and a network 108 that communicatively connects client device 102 to each of resource provider 104 and authentication system 106.

Generally speaking, secured access system 100 operates to provide a principal associated with client device 102 with access to a resource of resource provider 104 only if such principal is successfully authenticated by authentication system 106. A principal may comprise, for example and without limitation, a user of client device 102, an application executing on client device 102, client device 102 itself, or some combination thereof. A resource may comprise, for example and without limitation, an information object (e.g., a document, Web page, image, audio file, video file, or output of an executable), an application, a service, a physical device, or any other resource to which access may be provided by resource provider 104.

Client device 102 is intended to represent any one of a wide variety of devices that are operable to communicate with resource provider 104 to access a resource thereof on behalf of a principal and to communicate with authentication system 106 to facilitate authentication of such principal. Client device 102 may comprise, for example and without limitation, a computer (e.g., desktop, laptop, tablet, or notebook), a smart phone, a video game console, a personal media player, a wearable device, a smart appliance, or an embedded device.

Resource provider 104 is intended to represent a device that is operable to communicate with client device 102 for the purpose of providing client device 102 with access to a resource if a principal associated with client device 102 is properly authenticated by authentication system 106. Resource provider 104 may comprise, for example and without limitation, one or more server computers.

Authentication system 106 is a system that is operable to authenticate a principal associated with client device 102 such that the principal can access a resource provided by resource provider 104 via client device 102. Authentication system 106 may be implemented, for example and without limitation, by one or more server computers.

Network 104 is intended to represent any type of network or combination of networks suitable for facilitating communication between electronic devices, such as between client device 102 and resource provider 104 and between client device 102 and authentication system 106. Network 104 may include, for example and without limitation, a wide area network, a local area network, a private network, a public network, a packet network, a circuit-switched network, a wired network, and/or a wireless network. Communication between client device 102 and resource provider 104 and between client device 102 and authentication system 106 may be carried out over network 108 using one or more well-known network communication protocols.

In view of the foregoing context, an exemplary process by which a principal associated with client device 102 may obtain access to a resource provided by resource provider 104 in secured access system 100 will now be described in reference to a sequence diagram 200 of FIG. 2.

Figure 2:
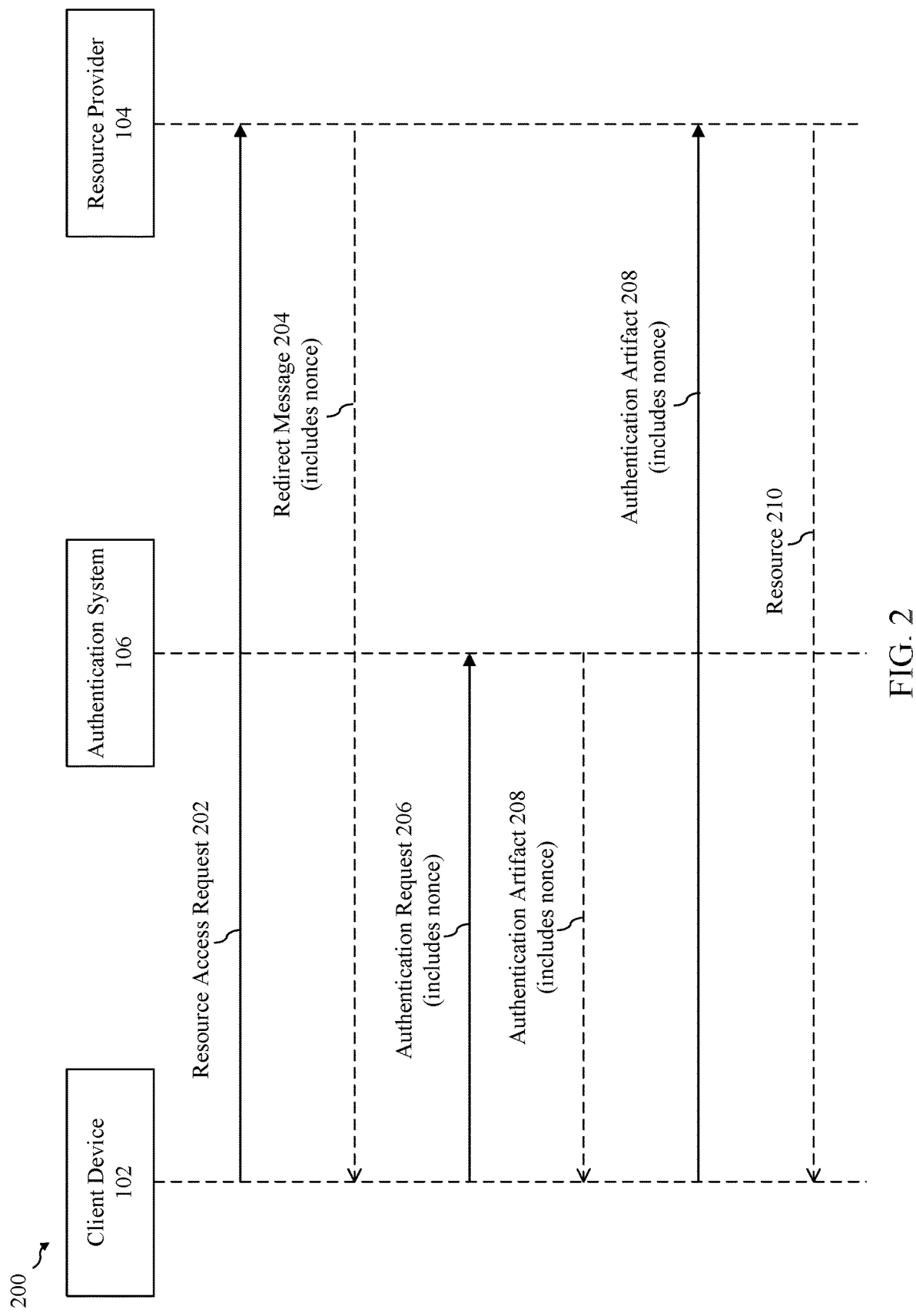
FIG. 2 is a sequence diagram that illustrates a process by which a principal gains access to a resource within the secured access system of FIG. 1.

As shown in sequence diagram 200 of FIG. 2, the process begins when client device 102 sends a resource access request 202 to resource provider 104 on behalf of a principal (e.g., a user of client device 102, an application executing on client device 102, client device 102 itself, or some combination thereof). Resource access request 202 may specify a resource 210 of resource provider 104 for which access is sought.

Resource provider 104 receives resource access request 202 and determines that an authentication artifact is required to grant the request. For example, resource provider 104 may determine that an authentication artifact is required because the principal associated with client device 102 has not yet provided one or because an authentication artifact that was previously provided by the principal associated with client device 102 has expired. In either case, based on the determination, resource provider 104 sends a redirect message 204 to client device 102, redirecting client device 102 to authentication system 106 for the purpose of obtaining an authentication artifact. Resource provider 104 generates a cryptographic nonce ("nonce") that it includes with redirect message 204. Resource provider 104 may be configured to include a different (e.g., unique) nonce with each such redirect message it sends to a client device.

In response to receiving redirect message 204, client device 102 sends an authentication request 206 to authentication system 106 on behalf of the principal, wherein authentication request 206 includes the aforementioned nonce and a credential of the principal. In certain implementations, authentication request 206 may comprise multiple communications. For example, client device 102 may initiate authentication request 206 by sending a first communication to authentication system 106 that includes the aforementioned nonce. In response to receiving the first communication, authentication system 106 may interact with client device 106 to obtain the credential as part of a second communication therefrom. For example, authentication system 106 may cause a user interface to be presented by client device 102 via which the user may submit the credential to authentication system 106. Alternatively, authentication system 106 may obtain the credential from a cookie that is stored on client device 102. However, these are examples only and are not intended to be limiting. Other techniques may be used for communicating the credential from client device 102 to authentication system 106.

After receiving authentication request 206, authentication system 106 evaluates certain information included in authentication request 206 against a set of authentication criteria to determine if the principal associated with authentication request 206 should be authenticated. To perform this function, authentication system 106 may access a directory 116 that stores information about principals that can be used by authentication system 106 to determine if the authentication criteria have been met. For example, directory 116 may store information that can be used by authentication system 106 to verify the credential provided as part of authentication request 106. For the sake of this example, it will be assumed that authentication system 106 determines that the authentication criteria have been met.

In response to determining that the authentication criteria have been met, authentication system 106 generates an authentication artifact 208 that includes the aforementioned nonce, digitally signs it using a private encryption key of a public-private key pair and sends it to client device 102. Authentication artifact 208 may comprise, for example and without limitation, an access token, an ID token, a refresh token, or a Security Assertions Markup Language (SAML) token. The private encryption key used to sign authentication artifact 208 is not stored by or otherwise accessible to either client device 102 or resource provider 104. However, the public encryption key of the public-private key pair is stored by or otherwise accessible to resource provider 104.

Client device 102 receives authentication artifact 208 and sends it to resource provider 104. Resource provider 104 receives authentication artifact 208 and performs a number of checks thereon to determine if it is sufficient to allow the principal associated with client device 102 to access resource 210. For example, resource provider 104 checks the digital signature of authentication artifact 208 using the public encryption key of the aforementioned public-private key pair. By verifying the digital signature of authentication artifact 208 in this manner, resource provider 104 can obtain an indication that artifact 208 was generated by authentication system 106 as opposed to some other entity. If this verification of the digital signature fails, then resource provider 104 will not permit the principal associated with client device 102 to access resource 210.

Resource provider 104 may also check certain items of information included within authentication artifact 208 before granting access to resource 210. For example, resource provider 104 may check that the nonce that it previously provided to client device 102 with redirect message 204 is part of authentication artifact 208 that was digitally signed by authentication system 106. If the nonce is included, then this implies that authentication artifact 208 was generated in response to the previous interaction between resource provider 104 and client device 102. Furthermore, the inclusion of the nonce in authentication artifact 208 can help protect resource provider 104 against replay scenarios, in that it allows resource provider 104 to reject an authentication artifact that includes a nonce that matches a nonce of a previously-received authentication artifact.

In addition to checking the nonce, resource provider 104 may also check other items of information included in authentication artifact 208, such as an issue time and an expiration time included in authentication artifact 208. For example, resource provider 104 may confirm that an issue time included in authentication artifact 208 is valid (e.g., that the issue time is earlier than a current time and/or within a predetermined time window) as a condition for granting access. Likewise, resource provider 104 may ensure that an expiration time that is specified by authentication artifact 208 has not passed and/or sufficiently extends beyond a current time as a condition for granting access.

If resource provider 104 determines that authentication artifact 208 passes the aforementioned checks, then resource provider 104 provides client device 102 with access to resource 210 as shown at the bottom of sequence diagram 200.

Figure 3:
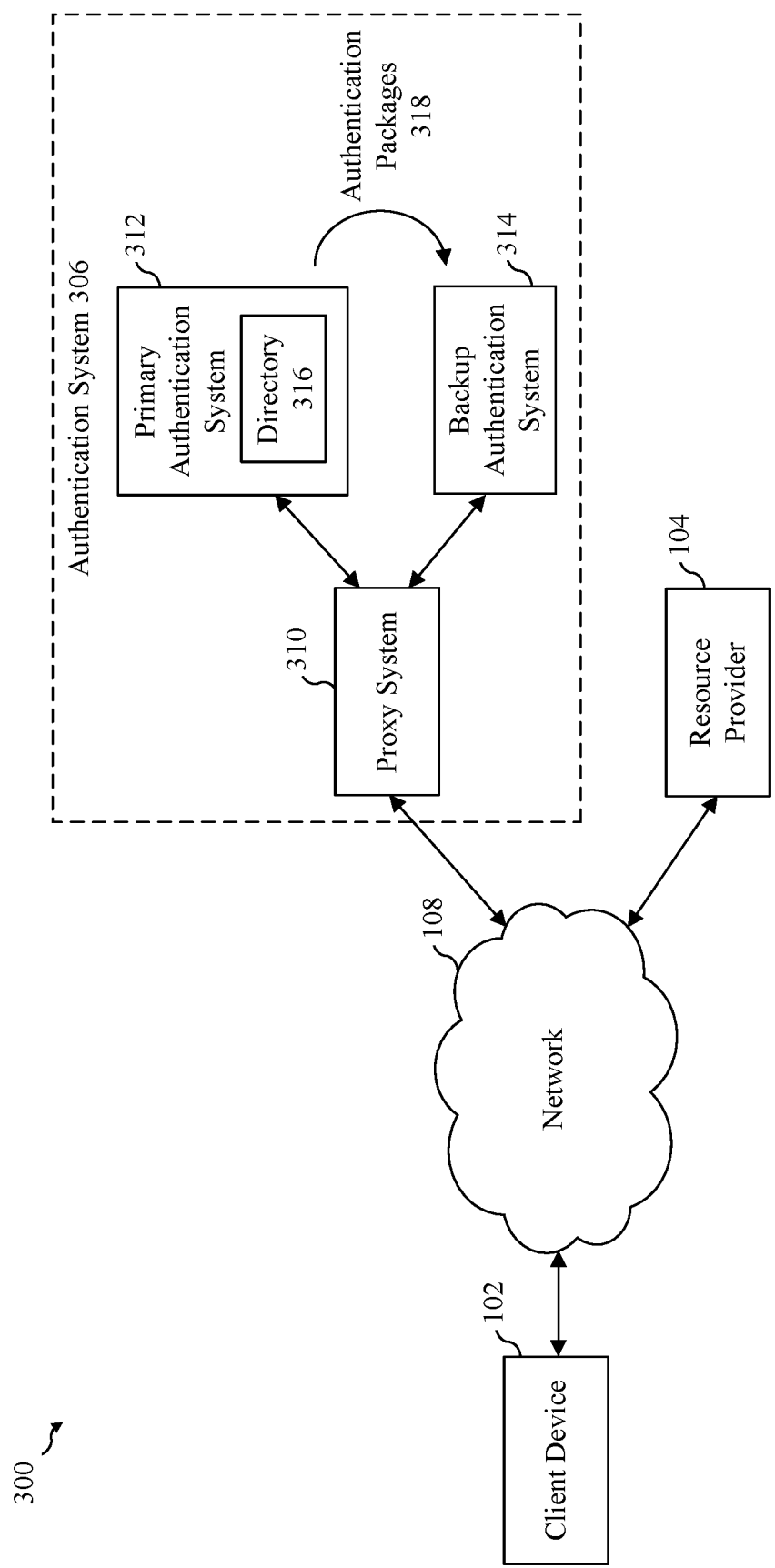
FIG. 3 is a block diagram of a secured access system that comprises an authentication system that includes both a primary authentication system and a backup authentication system.

In secured access system 100, if authentication system 106 suffers an outage or is otherwise unable to provide a valid response to authentication requests from client devices (e.g., client device 102) for some period of time, then principals cannot authenticate to obtain or maintain access to resources (e.g., resources of resource provider 104) during that time period. To help address this issue, a system such as secured access system 300 of FIG. 3 may be implemented. As shown in FIG. 3, secured access system 300 is similar to secured access system 100 of FIG. 1, except that authentication system 106 has been replaced with an authentication system 306 that itself comprises a proxy system 310, a primary authentication system 312, and a backup authentication system 314, each of which may be implemented, for example and without limitation, by one or more server computers. A more detailed description of secured access system 300 can be found in the following two commonly-owned and co-pending patent applications, the entirety of which are incorporated by reference herein: U.S. patent application Ser. No. 17/334,648, filed May 28, 2021, and entitled "Backup Authentication System Configured to Use an Authentication Package from a Primary Authentication System to Authenticate a Principal" and U.S. patent application Ser. No. 17/334,649, filed May 28, 2021, and entitled "Proxy Configured to Dynamically Failover Authentication Traffic to a Backup Authentication System."

In secured access system 300, primary authentication system 312 is implemented in a like manner to authentication system 106 of FIG. 1 and is thus capable of generating authentication artifacts and digitally signing such authentication artifacts with a private encryption key that is accessible thereto. Also, like authentication system 106, primary authentication system 312 includes or is otherwise able to access a directory 316 that stores information about principals, including information that can be used by authentication system 312 to authenticate such principals. For example, directory 316 may store information that can be used to verify credentials provided by such principals.

Backup authentication system 314 differs from primary authentication system 312 in that it does not possess the private encryption key that primary authentication system 112 does, and thus cannot digitally sign authentication artifacts. For example, backup authentication system 314 may be implemented in a cloud that allows compute resources to be shared between backup authentication system 314 and other processes. Since backup authentication system 314 may only operate periodically (e.g., only when primary authentication system 312 is unable to provide valid responses to authentication requests), such an implementation may be deemed more efficient and economical than one in which dedicated compute resources are allocated to background authentication system 314. In this context, it may be deemed undesirable to store the private encryption key in backup authentication system 314 because this could create a security risk. In contrast, primary authentication system 312 may be implemented in a cloud that is different from the cloud used to implement backup authentication system 314 and that doesn't allow the same degree of sharing of compute resources between different processes. Implementing primary authentication system 312 and backup authentication system 314 on different clouds also has the benefit of reducing the chance that an outage that impacts one system will also impact the other.

Furthermore, unlike primary authentication system 312, backup authentication system 314 does not have access to the aforementioned directory 316 that stores information about principals.

As described in the above-referenced patent applications, despite these differences between primary authentication system 312 and backup authentication system 314, backup authentication system 314 is nevertheless capable of authenticating principals by virtue of the fact that primary authentication system 312 periodically or intermittently provides backup authentication system 314 with authentication packages 318 for storage thereby. Each one of authentication packages 318 includes an authentication artifact corresponding to a principal (digitally signed by primary authentication system 312 using the aforementioned private encryption key) as well as metadata that includes information that can be used to authenticate the principal (e.g., credential verification information that can be used to verify a credential of the principal). Thus, during time periods in which primary authentication system 312 is suffering from an outage or is otherwise unable to provide a valid response to authentication requests from client devices, proxy system 310 can direct authentication requests to backup authentication system 314 instead of primary authentication system 312 and backup authentication system 314 can service such requests.

Depending upon the implementation, authentication packages 318 may be provided from primary authentication system 312 to backup authentication system 314 at different times. For example, in one implementation, primary authentication system 312 issues an authentication package to backup authentication system 314 each time that it issues an authentication artifact to a principal. In this case, primary authentication system 312 makes a copy of the authentication artifact that it issues to the principal and includes it in an authentication package 318 that it provides to backup authentication system 314 for caching thereby. When the originally-issued authentication artifact expires, the principal may request a new authentication artifact to maintain access to a resource. If primary authentication system 112 is unable to provide a valid response to such a request at that time, proxy system 310 can direct the request to backup authentication system 314 for handling thereby.

To help further illustrate a manner of operation of secured access system 300 of FIG. 3, an exemplary process will now be described by which a principal associated with client device 102 may obtain access to a resource provided by resource provider 104 in secured access system 300 when primary authentication system 312 is unable to provide a valid response to an authentication request. In particular, this process will now be described in reference to sequence diagram 400 of FIG. 4.

Figure 4:
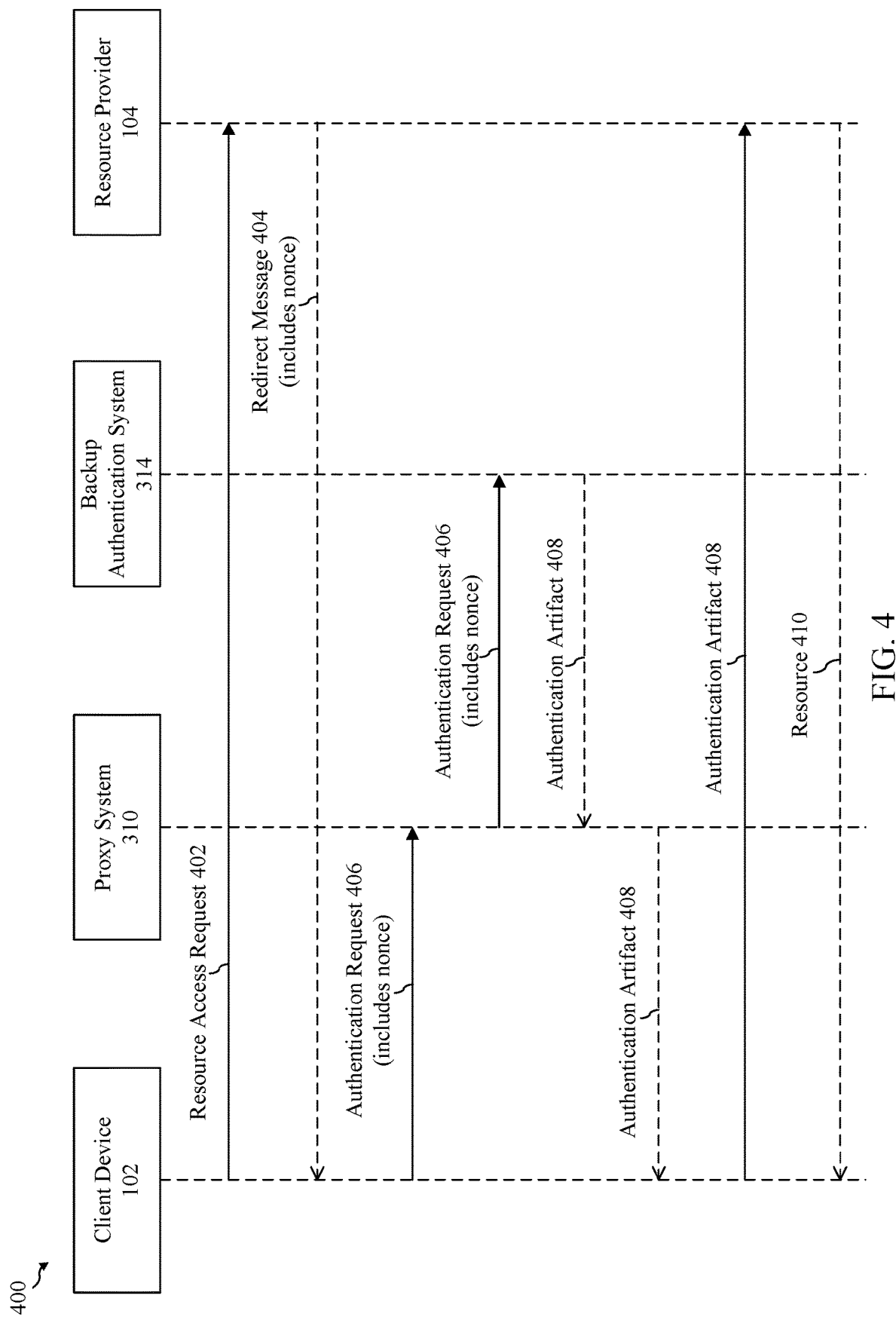
FIG. 4 is a sequence diagram that illustrates a process by which a principal gains access to a resource within the secured access system of FIG. 3 when the primary authentication system thereof is unable to provide a valid response to an authentication request.

As shown in sequence diagram 400 of FIG. 4, the process begins when client device 102 sends a resource access request 402 to resource provider 104 on behalf of a principal (e.g., a user of client device 102, an application executing on client device 102, client device 102 itself, or some combination thereof). Resource access request 402 may specify a resource 410 of resource provider 104 for which access is sought.

Resource provider 104 receives resource access request 402 and determines that an authentication artifact is required to grant the request. For example, resource provider 104 may determine that an authentication artifact is required because the principal associated with client device 102 has not yet provided one or because an authentication artifact that was previously provided by the principal associated with client device 102 has expired. In either case, based on the determination, resource provider 104 sends a redirect message 404 to client device 102, redirecting client device 102 to proxy system 310 for the purpose of obtaining an authentication artifact. Resource provider 104 generates a nonce that it includes with redirect message 404. As noted above, resource provider 104 may be configured to include a different (e.g., unique) nonce with each such redirect message it sends to a client device.

In response to receiving redirect message 404, client device 102 sends an authentication request 406 to proxy system 310 on behalf of the principal, wherein authentication request 406 includes the aforementioned nonce and a credential of the principal. In this example, proxy system 310 determines that primary authentication system 312 is currently unable to provide a valid response to authentication request 406 and thus directs authentication request 406 to backup authentication system 314. In certain implementations, authentication request 406 may comprise multiple communications between client device 102 and backup authentication system 314 via proxy system 310. For example, client device 102 may initiate authentication request 406 by sending a first communication to proxy system 310 that includes the aforementioned nonce and proxy system 310 may direct this first communication to backup authentication system 314. In response to receiving the first communication, backup authentication system 314 may interact with client device 102 via proxy system 310 to obtain the credential as part of a second communication therefrom. For example, backup authentication system 314 may cause a user interface to be presented by client device 102 via which the user may submit the credential to backup authentication system 314 via proxy system 310. Alternatively, backup authentication system 314 may obtain the credential from a cookie that is stored on client device 102 via proxy system 310. However, these are examples only and are not intended to be limiting and other techniques may be used for communicating the credential from client device 102 to backup authentication system 314 via proxy system 310.

After receiving authentication request 406, backup authentication system 314 determines whether it possesses a stored authentication package corresponding to the principal associated with authentication request 406. This may entail, for example, matching a principal identifier (ID) included in authentication request 406 with a principal ID associated with a stored authentication package. For the purposes of this example, it will be assumed that backup authentication system 314 determines that it does possess such a stored authentication package. In this case, backup authentication system 314 evaluates certain information included in authentication request 406 against a set of authentication criteria specified by the metadata of the authentication package to determine if the principal associated with authentication request 406 should be authenticated. For example, the metadata of the authentication package may include information that can be used by backup authentication system 314 to verify the credential provided as part of authentication request 406. For the sake of this example, it will be assumed that backup authentication system 314 determines that the authentication criteria have been met.

In response to determining that the authentication criteria have been met, backup authentication system 314 provides the authentication artifact included in the relevant authentication package as authentication artifact 408 to client device 102 via proxy system 310. In this scenario, since authentication artifact 408 was provided to backup authentication system 314 prior to the generation of redirect message 404 and its associated nonce by resource provider 104 and because authentication artifact 408 has already been digitally signed by primary authentication system 312 using its private encryption key, authentication artifact 408 cannot be modified by backup authentication system 314 to include the nonce provided with redirect message 404 without invalidating the digital signature. Consequently, authentication artifact 408 does not include the nonce included with redirect message 404.

Client device 102 receives authentication artifact 408 and sends it to resource provider 104. Resource provider 104 receives authentication artifact 408 and performs a number of checks thereon to determine if it is sufficient to allow the principal associated with client device 102 to access resource 410. For example, resource provider 104 checks the digital signature of authentication artifact 408 using the public encryption key that corresponds to the private encryption key of primary authentication system 312. By verifying the digital signature of authentication artifact 408 in this manner, resource provider 104 can obtain an indication that artifact 408 was generated by primary authentication system 312 as opposed to some other entity. If this verification of the digital signature fails, then resource provider 104 will not permit the principal associated with client device 102 to access resource 410.

Resource provider 104 may also check certain items of information included within authentication artifact 408 before granting access to resource 410, such as an issue time and an expiration time included in authentication artifact 408. For example, resource provider 104 may confirm that an issue time included in authentication artifact 408 is valid (e.g., earlier than a current time and/or within a predetermined time window) before granting access. Likewise, resource provider 104 may ensure that an expiration time that is specified by authentication artifact 408 has not passed and/or sufficiently extends beyond a current time before granting access.

If resource provider 104 determines that authentication artifact 208 passes the aforementioned checks, then resource provider 104 provides client device 102 with access to resource 210 as shown at the bottom of sequence diagram 200.

In secured access system 300, certain accommodations may need to be made to support the operation of backup authentication system 314 as described above in reference to FIG. 4. For example, as noted above, authentication artifact 408 issued by backup authentication system 314 may be a copy of an authentication artifact that was previously issued by primary authentication system 312 as part of a different authentication transaction. Consequently, authentication artifact 408 may include a different nonce than the nonce that was included with redirect message 404 by resource provider 104. For this reason, resource provider 104 must be adapted to accept authentication artifact 408 even though authentication artifact 408 does not include the proper nonce. In fact, this deviation from normal behavior must be implemented by any resource provider that is capable of receiving authentication artifacts from backup authentication system 314. However, such an adaptation may be deemed undesirable from a security perspective, since it entails ignoring a check on the validity of authentication artifact 408, as well as from a system complexity standpoint, since it requires all resource providers interacting with secured access system 300 to implement a special behavior that should only apply during periods in which authentication artifacts are being received from backup authentication system 314. Ideally, such resource providers should be able to implement the same security protocols at all times and those protocols should not need to vary based on real-time knowledge concerning the manner of operation of authentication system 306.

Since authentication artifact 408 issued by backup authentication system 314 may be a copy of an authentication artifact that was previously issued by primary authentication system 312, authentication artifact 408 may also include an issue time that is not representative of (e.g., may be earlier than) the time at which authentication artifact 408 is actually issued by backup authentication system 314. This can impact logic implemented by resource provider 104 that validates (or whose operation otherwise depends on) the value of the issue time included in authentication artifact 408. For example, such logic may need to be adapted to accommodate incorrect issue times.

To accommodate the operation of backup authentication system 314, primary authentication system 312 may also be required to provide backup authentication system 314 with authentication tokens that have expiration times that are far longer than the expiration times normally associated with authentication tokens. For example, in accordance with a security policy of secured access system 300, primary authentication system 312 may be configured to issue authentication tokens that expire one hour after the issue time, thereby ensuring that the principal is periodically re-authenticated at a desired frequency. However, because backup authentication system 314 may be configured to provide authentication artifacts during periods of unavailability of primary authentication system 312 that extend beyond an hour, primary authentication system 312 may provide backup authentication system 314 with authentication artifacts that expire longer (e.g., far longer) than an hour after their issue time. For example, the expiration time associated with such authentication artifacts may be set to three days after the issue time. However, such a deviation from the security policy of secured access system 300 may be deemed undesirable as it enables a principal to access resources for a longer (e.g., far longer) amount of time without re-authenticating themselves.

One potential approach to addressing this issue could involve providing backup authentication system 314 with the same encryption key that was used by primary authentication system to issue the original authentication artifact, or some other private encryption key of primary authentication system 312 for which resource provider 104 possesses the corresponding public encryption key. This would enable backup authentication system 314 to modify the stored copy of that authentication artifact to include the correct nonce, the correct issue time, and an updated expiration time, and then digitally sign the modified authentication artifact using an encryption key of primary authentication system 312. This would also enable such authentication artifact to include a shorter expiration time that better accords with a security policy of secured access system 300. However, as noted above, backup authentication system 314 may be implemented on a cloud (or other networked set of computers) that allows for a variety of different processes to share the same compute resources, and thus it may be deemed undesirable from a security standpoint to provide an encryption key of primary authentication system 312 to backup authentication system 314.

Figure 5:
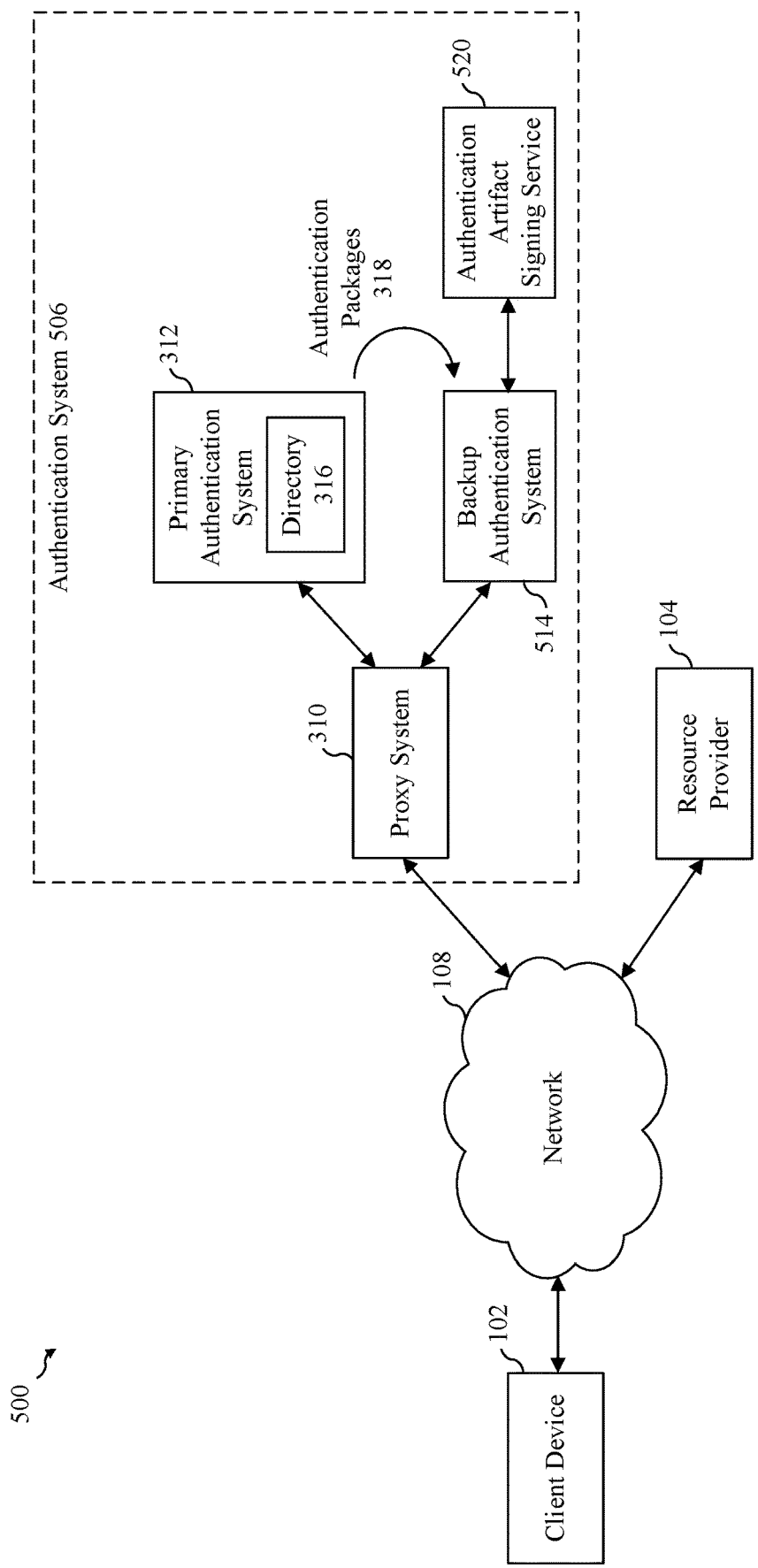
FIG. 5 is a block diagram of a secured access system that comprises an authentication system that includes a primary authentication system, a backup authentication system, and an authentication artifact signing service, in accordance with an embodiment.

A secured access system 500 will now be described in reference to FIG. 5 that addresses the aforementioned issues associated with secured access system 300. Secured access system 500 is implemented in a like manner to secured access system 300 except that authentication system 506 replaces authentication system 306. As shown in FIG. 5, authentication system 506 includes proxy system 310, primary authentication system 312, a backup authentication system 514 (which may be considered a modified implementation of backup authentication system 314), and an authentication artifact signing service 520. Each of proxy system 310, primary authentication system 312, backup authentication system 514 and authentication artifact signing service 520 may be implemented, for example and without limitation, by one or more server computers.

In secured access system 500, proxy system 310 and primary authentication system 312 are configured to operate in substantially the same manner as described above in reference to secured access system 300 of FIG. 3. However, backup authentication system 514 is configured to operate differently than backup authentication system 314 in that, rather than simply issuing a stored authentication artifact to a principal associated with a client device as was previously described, backup authentication system 514 is configured to identify one or more modifications to be made to the stored authentication artifact prior to issuance and to send a request comprising the stored authentication artifact and a specification of the modification(s) to be made thereto to authentication artifact signing service 520.

Authentication artifact signing service 520 is a computer-implemented service that is operable to receive the request from backup authentication system 514, apply the specified modification(s) to the stored authentication artifact to produce a modified authentication artifact, digitally sign the modified authentication artifact using an encryption key of primary authentication system 312 to digitally sign the stored authentication artifact, and return the digitally signed modified authentication artifact to backup authentication system 514.

Backup authentication system 514 is further configured to receive the digitally-signed modified authentication artifact from authentication artifact signing service 520 and to issue such artifact to a client device to authenticate a principal associated therewith.

To help further illustrate a manner of operation of secured access system 500 of FIG. 5, an exemplary process will now be described by which a principal associated with client device 102 may obtain access to a resource provided by resource provider 104 in secured access system 500 when primary authentication system 312 is unable to provide a valid response to an authentication request. In particular, this process will now be described in reference to sequence diagram 600 of FIG. 6.

Figure 6:
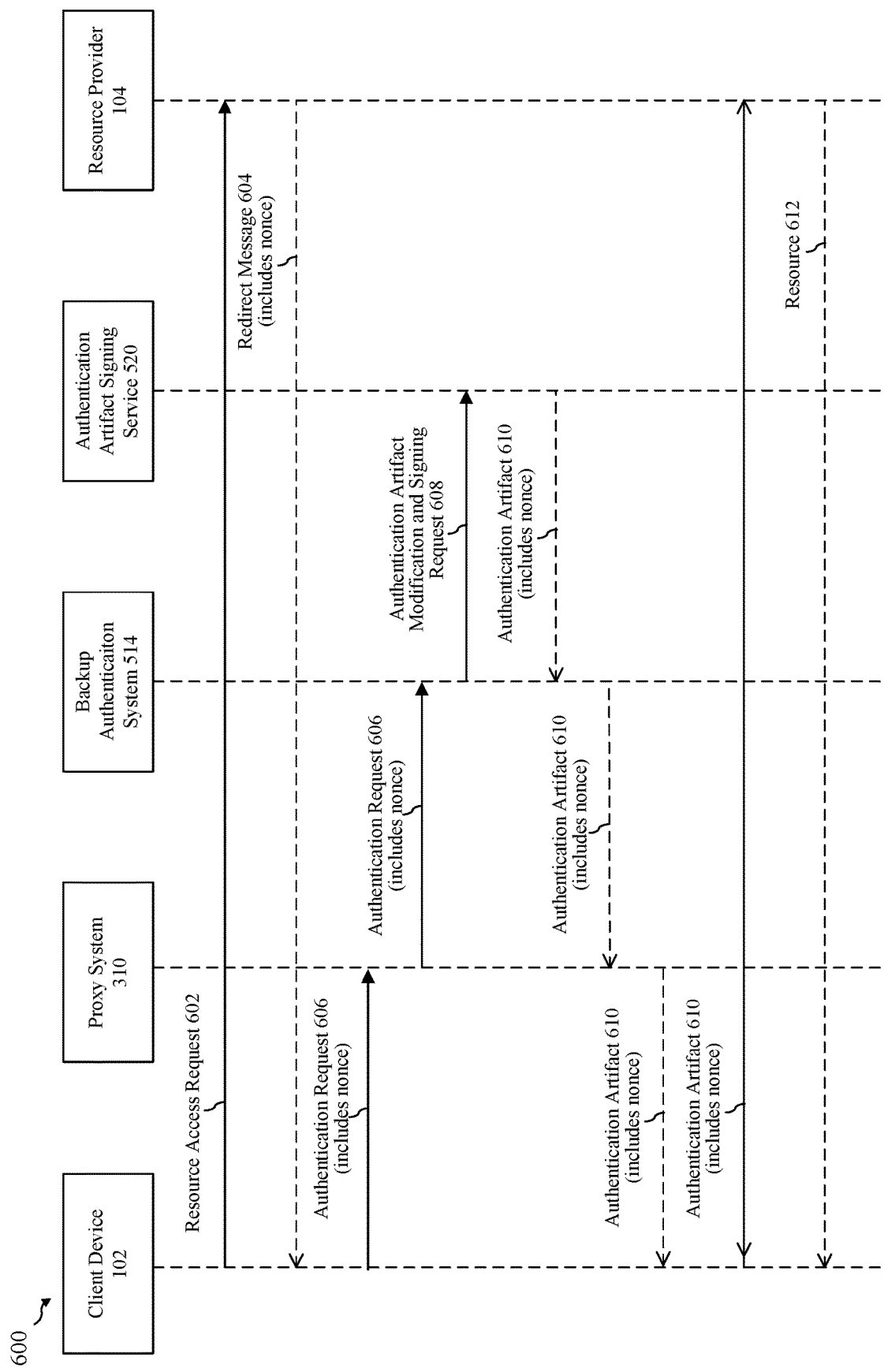
FIG. 6 is a sequence diagram that illustrates a process by which a principal gains access to a resource within the secured access system of FIG. 5 when the primary authentication system thereof is unable to provide a valid response to an authentication request.

As shown in sequence diagram 600 of FIG. 6, the process begins when client device 102 sends a resource access request 602 to resource provider 104 on behalf of a principal (e.g., a user of client device 102, an application executing on client device 102, client device 102 itself, or some combination thereof). Resource access request 602 may specify a resource 612 of resource provider 104 for which access is sought.

Resource provider 104 receives resource access request 602 and determines that an authentication artifact is required to grant the request. For example, resource provider 104 may determine that an authentication artifact is required because the principal associated with client device 102 has not yet provided one or because an authentication artifact that was previously provided by the principal associated with client device 102 has expired. In either case, based on the determination, resource provider 104 sends a redirect message 604 to client device 102, redirecting client device 102 to proxy system 310 for the purpose of obtaining an authentication artifact. Resource provider 104 generates a nonce that it includes with redirect message 604. As noted above, resource provider 104 may be configured to include a different (e.g., unique) nonce with each such redirect message it sends to a client device.

In response to receiving redirect message 604, client device 102 sends an authentication request 606 to proxy system 310 on behalf of the principal, wherein authentication request 606 includes the aforementioned nonce and a credential of the principal. In this example, proxy system 310 determines that primary authentication system 312 is currently unable to provide a valid response to authentication request 606 and thus directs authentication request 606 to backup authentication system 514. In certain implementations, authentication request 606 may comprise multiple communications between client device 102 and backup authentication system 514 via proxy system 310. For example, client device 102 may initiate authentication request 606 by sending a first communication to proxy system 310 that includes the aforementioned nonce and proxy system 310 may direct this first communication to backup authentication system 514. In response to receiving the first communication, backup authentication system 514 may interact with client device 102 via proxy system 310 to obtain the credential as part of a second communication therefrom. For example, backup authentication system 514 may cause a user interface to be presented by client device 102 via which the user may submit the credential to backup authentication system 514 via proxy system 310. Alternatively, backup authentication system 514 may obtain the credential from a cookie that is stored on client device 102 via proxy system 310. However, these are examples only and are not intended to be limiting and other techniques may be used for communicating the credential from client device 102 to backup authentication system 514 via proxy system 310.

After receiving authentication request 606, backup authentication system 514 determines if it possesses a stored authentication package corresponding to the principal associated with authentication request 606. This may entail, for example, matching a principal ID included in authentication request 406 with a principal ID associated with a stored authentication package. For the purposes of this example, it will be assumed that backup authentication system 514 determines that it does possess such a stored authentication package. In this case, backup authentication system 514 evaluates certain information included in authentication request 606 against a set of authentication criteria specified by the metadata of the authentication package to determine if the principal associated with authentication request 606 should be authenticated. For example, the metadata of the authentication package may include information that can be used by backup authentication system 514 to verify the credential provided as part of authentication request 606. For the sake of this example, it will be assumed that backup authentication system 514 determines that the authentication criteria have been met.

In response to determining that the authentication criteria have been met, backup authentication system 514 identifies one or more modifications to be made to the authentication artifact included in the relevant authentication package. For example, backup authentication system 514 may determine that (a) a nonce originally included in the stored authentication artifact should be replaced with the nonce provided with redirect message 604 by resource provider 104; (b) an issue time originally included in the stored authentication artifact should be replaced with a new (e.g., current) issue time; and (c) an expiration time originally included in the stored authentication artifact should be replaced with a new expiration time. Backup authentication system 514 then sends a copy of the stored authentication artifact and a specification of the modification(s) to be made thereto to authentication artifact signing service 520 as part of an authentication artifact modification and signing request 608 ("request 608").

Upon receiving request 608, authentication artifact signing service 520 performs one or more checks to determine if request 608 should be honored. For example, authentication artifact signing service 520 may be configured to verify that request 608 originated from backup authentication system 514 by verifying that request 608 includes a digital certificate from a designated certificate authority. However, this is only one example, and authentication artifact signing service 520 may be configured to verify that request 608 originated from backup authentication system 514 in other ways as well.

Authentication artifact signing service 520 may also be configured to verify that the authentication artifact included in request 608 was generated by primary authentication system 312. For example, authentication artifact signing service 520 may be configured to perform this function by validating the digital signature of the authentication artifact included in request 608 using a public encryption key that corresponds to the private encryption key used by primary authentication system 312 to sign the authentication artifact. However, this is only one example, and authentication artifact signing service 520 may be configured to verify that the authentication artifact included in request 608 was generated by primary authentication system 312 in other ways as well.

Authentication artifact signing service 520 may also be configured to verify that the one or more modifications to be made to the authentication artifact are permissible. For example, authentication artifact signing service 520 may be configured to ensure that any proposed modification to the authentication artifact accords with one or more rules and/or policies that govern (a) which elements of an authentication artifact may be modified and/or (b) what constitutes a valid modification for each such element.

Furthermore, an application programming interface (API) of authentication artifact signing service 520 may require that request 608 be formatted in a way that essentially limits which elements of the authentication artifact may be targeted for modification. For example, the API may only allow request 608 to specify values corresponding to a predefined set of modifiable elements of the authentication artifact. In a more specific example of the foregoing, the API may only allow request 608 to include a new nonce value, a new issue time and a new expiration time to be applied to the authentication artifact, thereby limiting the targeted modifications to these elements only. However, this is merely one example and is not intended to be limiting.

Authentication artifact signing service 520 may also be configured to verify a freshness of the authentication artifact that is passed thereto as part of request 608. For example, authentication artifact signing service 520 may be configured to verify the freshness of the authentication artifact by determining that an issue time included in the authentication artifact is within a predetermined time window and/or that an expiration time that is specified by the authentication artifact has not passed and/or sufficiently extends beyond a current time.

In an embodiment, authentication artifact signing service 520 may also be configured to verify that the authentication artifact that is passed thereto as part of request 608 includes an indicator that indicates that the authentication artifact is suitable for modification and re-signing. In accordance with such an embodiment, primary authentication system 312 may be configured to include such an indicator in the authentication artifacts that it sends to backup authentication system 514 as part of authentication packages 318. If authentication artifact signing service 520 determines that the authentication artifact that is passed thereto as part of request 608 includes such an indicator, then this suggests that the authentication artifact is one for which modification and re-signing is proper. In further accordance with this embodiment, authentication artifact signing service 520 may remove such indicator from the authentication artifact when generating the modified authentication artifact, so that when such modified authentication artifact is ultimately issued to a principal, it cannot then be sent back to authentication artifact signing system 520 for further modification.

Based on the results of one or more of the foregoing checks, authentication artifact signing service 520 determines whether request 608 should be honored. For the purpose of this example, it will be assumed that authentication artifact signing service 520 determines that request 608 should be honored. In this case, authentication artifact signing service 520 applies the modification(s) specified by request 608 to the authentication artifact included in request 608, thereby generating a modified authentication artifact. For example, based on the parameters of request 608, authentication artifact signing service 520 may update the nonce, issue time and expiration time of the authentication artifact with the nonce included with redirect message 604, a new issue time, and a new expiration time, respectively, thereby generating the modified authentication artifact.

Authentication artifact signing service 520 then digitally signs the modified authentication artifact using an encryption key of primary authentication system 312. This encryption key may be identical to the private encryption key used by primary authentication system 312 to sign the original authentication artifact or it may be another private encryption key of primary authentication system 312 for which resource provider 104 possesses a corresponding public key. Authentication artifact signing service then sends the digitally-signed modified authentication artifact to backup authentication system 514 as authentication artifact 610.

Backup authentication system 514 then provides authentication artifact 610 to client device 102 via proxy system 310.

Client device 102 receives authentication artifact 610 and sends it to resource provider 104. Resource provider 104 receives authentication artifact 610 and performs a number of checks thereon to determine if it is sufficient to allow the principal associated with client device 102 to access resource 612. For example, resource provider 104 checks the digital signature of authentication artifact 610 using a public encryption key that corresponds to a private encryption key of primary authentication system 312. Since authentication artifact signing service 520 signed authentication artifact 610 using a private encryption key of primary authentication system 312, the digital signature of authentication artifact 610 should pass this verification step. However, if this verification of the digital signature fails, then resource provider 104 will not permit the principal associated with client device 102 to access resource 612.

Resource provider 104 may also check certain items of information included within authentication artifact 610 before granting access to resource 612. For example, resource provider 104 may check that the nonce that it previously provided to client device 102 with redirect message 604 is part of authentication artifact 610, for reasons previously discussed. In an example embodiment discussed above, authentication artifact signing service 520 included the nonce provided with redirect message 604 in authentication artifact 610. This, in accordance with this embodiment, authentication artifact 610 will pass this test.

In addition to checking the nonce, resource provider 104 may also check other items of information included in authentication artifact 610, such as an issue time and an expiration time included in authentication artifact 610. For example, resource provider 104 may confirm that an issue time included in authentication artifact 610 is valid (e.g., that the issue time is earlier than a current time and/or within a predetermined time window) as a condition for granting access. Likewise, resource provider 104 may ensure that an expiration time that is specified by authentication artifact 610 has not passed and/or sufficiently extends beyond a current time as a condition for granting access. In an example embodiment discussed above, authentication artifact signing service 520 may include a new issue time and expiration time in authentication artifact 610, and thus these times will be checked during these operations.

If resource provider 104 determines that authentication artifact 610 passes the aforementioned checks, then resource provider 104 provides client device 102 with access to resource 612 as shown at the bottom of sequence diagram 600.

It can be seen from the foregoing description of sequence diagram 600 of FIG. 6 that secured access system 500 addresses certain issues described above with reference to secured access system 300 of FIG. 3. In particular, since authentication artifact signing service 520 can be used by backup authentication system 514 to (a) insert the correct nonce (i.e., the nonce included with redirect message 604), the correct issue time, and the desired expiration time into authentication artifact 610, and (b) sign authentication artifact 610 with an encryption key of primary authentication system 312, then any logic operating on resource provider that verifies (or otherwise depends on) those aspects of authentication artifact 610 can operate in the exact same manner regardless of whether authentication artifact 610 was provided by primary authentication system 312 or backup authentication system 514. No special accommodations need to be made for when authentication artifacts are being issued by backup authentication system 514.

Furthermore, these benefits can be achieved without providing a private encryption key used by primary authentication system 312 to backup authentication system 514, which as noted above may be operating in a cloud (or other set of networked computers) that may be deemed insufficiently secure because it enables compute resources to be shared by a variety of different processes. In this case, a private encryption key used by primary authentication system 312 is provided to authentication artifact signing service 520, which may be comprise a more secure operating environment than backup authentication system (e.g., because authentication artifact signing service 520 runs on a system that doesn't allow the same degree of sharing of computer resources by different processes).

In an embodiment, both primary authentication system 312 and authentication artifact signing service 520 may be operationally isolated from backup authentication system 514 (e.g., rely on different hardware, software and/or power than backup authentication system 514) and the processes running thereon may operate in a different security domain than those running on backup authentication system 514, such that backup authentication system 514 has no way to access the private encryption keys used to sign authentication artifacts by primary authentication system 312 and authentication artifact signing service 520.

Furthermore, in an embodiment, authentication artifact signing service 520 may be operationally isolated from primary authentication system 312, such that an outage impacting primary authentication system 312 will not impact authentication artifact signing service 520, thereby allowing authentication artifact signing service 520 to operate in support of backup authentication system 514 even when primary authentication system 312 is unavailable. For example, authentication artifact signing service 520 may be part of a system that is operationally isolated from primary authentication system 312 but nevertheless has access to the private encryption keys thereof for performing different functions other than those performed by primary authentication system 312. However, this is an example only and is not intended to be limiting.

For example, in another embodiment, authentication artifact signing service 520 may comprise part of primary authentication system 312. In further accordance with this embodiment, there may be a scenario in which primary authentication system 312 is operational but cannot provide valid responses to authentication requests because a dependency thereof (e.g., directory 316) has become inoperable or otherwise unavailable. In this case, authentication artifact signing service 520 within primary authentication system 312 may still operate to support the operations of backup authentication system 514 while the dependency is inoperable or otherwise unavailable.

Figure 7:
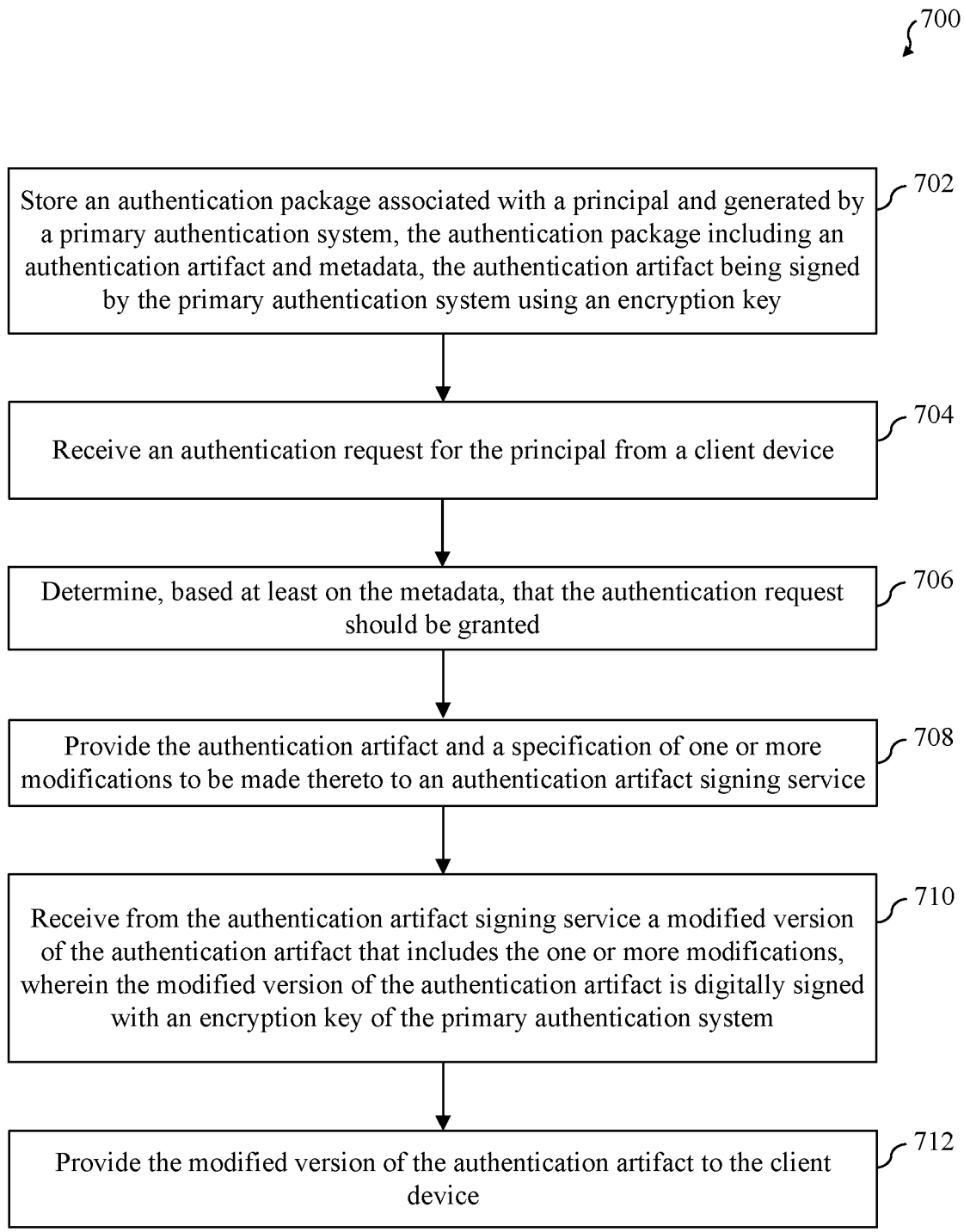
FIG. 7 depicts a flowchart of a method of authenticating a principal performed by a backup authentication system in accordance with an embodiment.

Various features of backup authentication system 514 will now be further described in reference to FIG. 7. In particular, FIG. 7 depicts a flowchart 700 of a method of authenticating a principal that may be performed by a backup authentication system, such as backup authentication system 514, in accordance with an embodiment. The method of flowchart 700 will now be described with continued reference to secured access system 500 of FIG. 5 and sequence diagram 600 of FIG. 6. However, the method is not limited to any particular embodiment, and may be implemented by other systems and/or using other components than those shown in FIGS. 5 and 6. Furthermore, the method of flowchart 700 may comprise additional steps, fewer steps, or may involve steps being performed in a different order than that shown in FIG. 7.

As shown in FIG. 7, the method of flowchart 700 begins at step 702, in which backup authentication system 514 stores authentication package 318 associated with a principal and generated by primary authentication system 312, wherein authentication package 318 includes an authentication artifact and metadata, and wherein the authentication artifact is signed by primary authentication system 312 using an encryption key (e.g., a private encryption key of a public-private key pair). The principal referred to in this step may comprise, for example and without limitation, a user associated with client computing device 102, an application associated with client computing device 102, client computing device 102 itself, or some combination thereof. The authentication token referred to in this step may comprise, for example and without limitation, an access token, an ID token, a refresh token, an SAML token, or the like.

At step 704, backup authentication system 514 receives an authentication request for the principal from client device 102. For example, as discussed above in reference to FIG. 6, backup authentication system 514 may receive from client device 102 an authentication request 606 for a principal associated therewith.

At step 706, backup authentication system 514 determines, based at least on the metadata, that the authentication request should be granted. For example, as discussed above in reference to FIG. 6, backup authentication system 514 may determine that authentication request 606 should be granted by evaluating certain information included in authentication request 606 against a set of authentication criteria specified by the metadata of the authentication package. For example, backup authentication system 514 may use information included in the metadata of the authentication package to verify a credential provided as part of authentication request 606. In response to determining that authentication request should be granted, backup authentication system 514 may perform steps 708, 710 and 712.

At step 708, backup authentication system 514 provides the authentication artifact and a specification of one or more modifications to be made thereto to authentication signing service 520. For example, as discussed above in reference to FIGS. 5 and 6, backup authentication system 514 may send request 608 to authentication artifact signing service 520 that includes the authentication artifact and a specification of one or more modifications to be made thereto.

By way of example only and without limitation, the specification of the modification(s) may include one or more of the following: a specification of a nonce to be added to the authentication artifact, wherein the nonce originates from a resource provider (e.g., resource provider 104) and is included with an authentication request for the principal (e.g., authentication request 606) received by backup authentication system 514 (note that this nonce may replace an old nonce in the authentication artifact); a specification of a new issue time that is to replace an old issue time in the authentication artifact; a specification of a new expiration time that is to replace an old expiration time in the authentication artifact; or a specification of a new Internet Protocol (IP) address associated with the principal that is to replace an old IP address associated with the principal in the authentication artifact. Still other modifications may be specified. For example, a claim, representation, or item of information included in the authentication artifact that has changed between the time the authentication artifact was generated by primary authentication system 312 and the time that backup authentication system 514 determines to issue the authentication artifact may be targeted for modification to ensure the accuracy of the information included in the authentication artifact prior to providing the authentication artifact to a resource provider (e.g., resource provider 104). However, it is to be understood that any claim, representation, or item of information included in the authentication artifact regardless of source may be subject to modification, depending upon the implementation.

At step 710, backup authentication system 514 receives from authentication artifact signing service 520 a modified version of the authentication artifact that includes the one or more modifications, wherein the modified version of the authentication artifact is digitally signed with an encryption key of primary authentication system 312. For example, as discussed above in reference to FIG. 6, backup authentication system 514 may receive authentication artifact 620 from authentication artifact signing service 520, wherein authentication artifact 620 includes the one or more modifications, and wherein authentication artifact 620 has been digitally signed by authentication artifact and signing service 520 with an encryption key of primary authentication system 312.

At step 712, backup authentication service 514 provides the modified version of the authentication artifact to client device 102. For example, as discussed above in reference to FIG. 6, backup authentication service 514 may provide authentication artifact 620 (which includes the aforementioned modifications) to client device 102 so that client device 102 can use authentication artifact 620 to authenticate the principal associated therewith.

Figure 8:
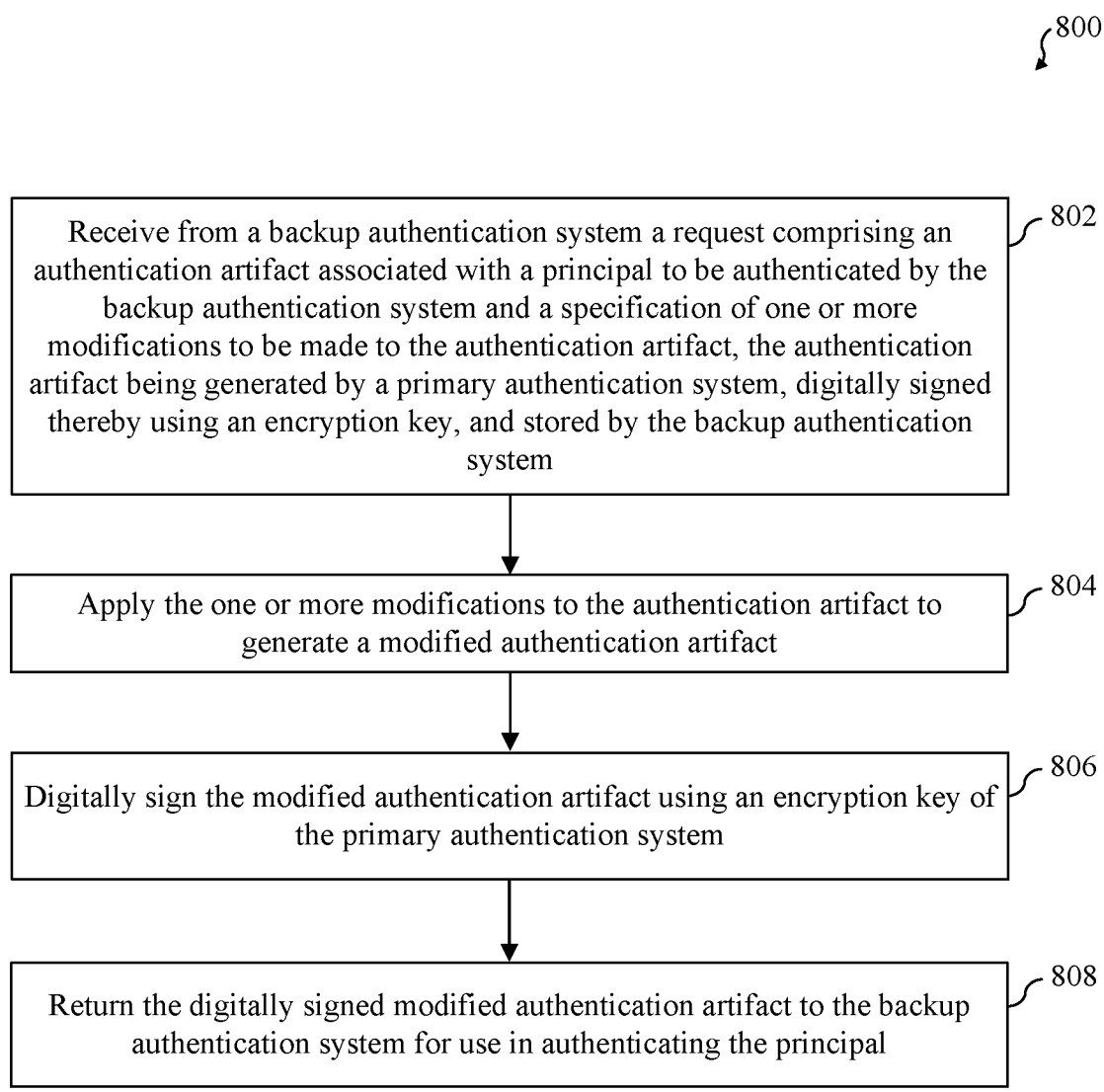
FIG. 8 depicts a flowchart of a method performed by an authentication artifact signing service in accordance with an embodiment.

Various features of authentication artifact signing service 520 will now be further described in reference to FIG. 8. In particular, FIG. 8 depicts a flowchart 800 of a method performed by an authentication artifact signing service, such as authentication artifact signing service 520, in accordance with an embodiment. The method of flowchart 800 will now be described with continued reference to secured access system 500 of FIG. 5 and sequence diagram 600 of FIG. 6. However, the method is not limited to any particular embodiment, and may be implemented by other systems and/or using other components than those shown in FIGS. 5 and 6. Furthermore, the method of flowchart 800 may comprise additional steps, fewer steps, or may involve steps being performed in a different order than that shown in FIG. 8.

As shown in FIG. 8, the method of flowchart 800 begins at step 802, in which authentication artifact signing service 520 receives from backup authentication system 514 a request comprising an authentication artifact associated with a principal to be authenticated by backup authentication system 514 and a specification of one or more modifications to be made to the authentication artifact, the authentication artifact being generated by primary authentication system 312, digitally signed thereby using an encryption key, and stored by backup authentication system 514. For example, as discussed above in reference to FIG. 6, authentication artifact signing service 520 may receive request 608 from backup authentication system 514 request, wherein request 608 comprises an authentication artifact associated with a principal to be authenticated by backup authentication system 514 and a specification of one or more modifications to be made to the authentication artifact. Furthermore, as was discussed above in reference to FIG. 6, the authentication artifact included in request 608 was generated by primary authentication system 312, digitally signed thereby using an encryption key (e.g., a private encryption key of a public-private key pair) and stored by backup authentication system 514.

At step 804, authentication artifact signing service 520 applies the one or more modifications to the authentication artifact to generate a modified authentication artifact. For example, as discussed above in reference to FIG. 6, authentication signing service 520 may apply one or more modification(s) specified by request 608 to the authentication artifact provided therewith. Examples of the types of modifications that may be specified by request 608 and applied by authentication artifact signing service 520 were previously discussed in reference to step 708 of flowchart 700 of FIG. 7, and thus will not be repeated here for the sake of brevity.

At step 806, authentication artifact signing service 520 digitally signs the modified authentication artifact using an encryption key of primary authentication system 312 to digitally sign the authentication artifact. For example, as discussed above in reference to FIG. 6, authentication artifact signing service 520 digitally signs authentication artifact 610 (which is a modified version of the authentication artifact provided in request 608) using an encryption key of primary authentication system 312.

At step 808, authentication artifact signing service 520 returns the digitally signed modified authentication artifact to backup authentication system 514 for use in authenticating the principal. For example, as discussed above in reference to FIG. 6, authentication artifact signing service 520 returns authentication artifact 610 (which is a digitally-signed modified version of the authentication artifact included in request 608) to backup authentication system 514 for use in authenticating the principal associated with client device 102.

In certain embodiments, authentication artifact signing service 520 may perform certain verification steps after it receives the request (e.g., request 608) in step 802, wherein the outcome of these steps may determine whether or not authentication artifact signing service 520 subsequently performs steps 804, 806 and 808. For example, a failure of one or more of these verification steps may result in authentication artifact signing service not performing steps 804, 806 and 808.

By way of example only and without limitation, to perform the verification steps, authentication artifact signing service 520 may perform one or more of the following: verify that the request originated from backup authentication system 514 (e.g., by determining that the request includes a digital certificate from a designated certificate authority); verify that the authentication artifact included in the request was generated by primary authentication system 312 (e.g., by validating the signature of the authentication artifact using a public encryption key that corresponds to the private encryption key used by primary authentication system 312 to sign the authentication artifact); verify that the modification(s) to be made to the authentication artifact are permissible (e.g., by determining is each such modification is in compliance with a set of security policies or rules); verifying a freshness of the authentication artifact included in the request (e.g., by inspecting one or more of an issue time or an expiration time included in the authentication artifact); or verifying that the authentication artifact includes an indicator that indicates that the authentication artifact is suitable for modification and re-signing. In the case where the authentication artifact includes an indicator that indicates that the authentication artifact is suitable for modification and re-signing, authentication artifact signing service 520 may remove the indicator from the authentication artifact when generating the modified authentication artifact in step 804, so that when such modified authentication artifact is ultimately issued to a principal, it cannot then be sent back to authentication artifact signing system 520 for further modification.

It is noted that, while the foregoing description refers to operations performed by a primary authentication system (e.g., primary authentication system 312) and a backup authentication system (e.g., backup authentication system 514), the same operations could be performed by any two authentication systems, regardless of the terminology used to describe such authentication systems or a relationship therebetween. For example, the operations described above that are attributed to backup authentication system 514 need not be performed by a "backup" authentication system that operates only when a "primary" authentication system is unable to provide valid responses to authentication requests. Rather, such operations could be performed by any authentication system that can store authentication artifacts generated by another authentication system, and that can utilize an authentication artifact signing service as described herein to modify those authentication artifacts for authentication purposes, regardless of the roles of such authentications systems or the relationship therebetween. For example, the two authentication systems may be concurrently operating authentication systems. Thus, in the foregoing description, the terms backup authentication system and primary authentication system may also be more generally referred to as simply a "first" authentication system and a "second" authentication system (or vice versa) to denote that they are two different authentication systems.

III. Example Computer System Implementation

Each of client device 102, resource provider 104, authentication system 506, proxy system 310, primary authentication system 312, backup authentication system 514, authentication artifact signing system 520, the operations of sequence diagram 600 of FIG. 6, the steps of flowchart 700 of FIG. 7 and the steps of flowchart 800 of FIG. 8 may be implemented in hardware, or hardware combined with software and/or firmware. For example, each of client device 102, resource provider 104, authentication system 506, proxy system 310, primary authentication system 312, backup authentication system 514, authentication artifact signing system 520, the operations sequence diagram 600 of FIG. 6, the steps of flowchart 700 of FIG. 7 and the steps of flowchart 800 of FIG. 8 may be implemented as computer program code/instructions configured to be executed in one or more processors and stored in a computer readable storage medium. Alternatively, each of client device 102, resource provider 104, authentication system 506, proxy system 310, primary authentication system 312, backup authentication system 514, authentication artifact signing system 520, the operations of sequence diagram 600 of FIG. 6, the steps of flowchart 700 of FIG. 7 and the steps of flowchart 800 of FIG. 8 may be implemented as hardware logic/electrical circuitry.

For instance, in an embodiment, one or more, in any combination, of client device 102, resource provider 104, authentication system 506, proxy system 310, primary authentication system 312, backup authentication system 514, authentication artifact signing system 520, the operations of sequence diagram 600 of FIG. 6, the steps of flowchart 700 of FIG. 7 and the steps of flowchart 800 of FIG. 8 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
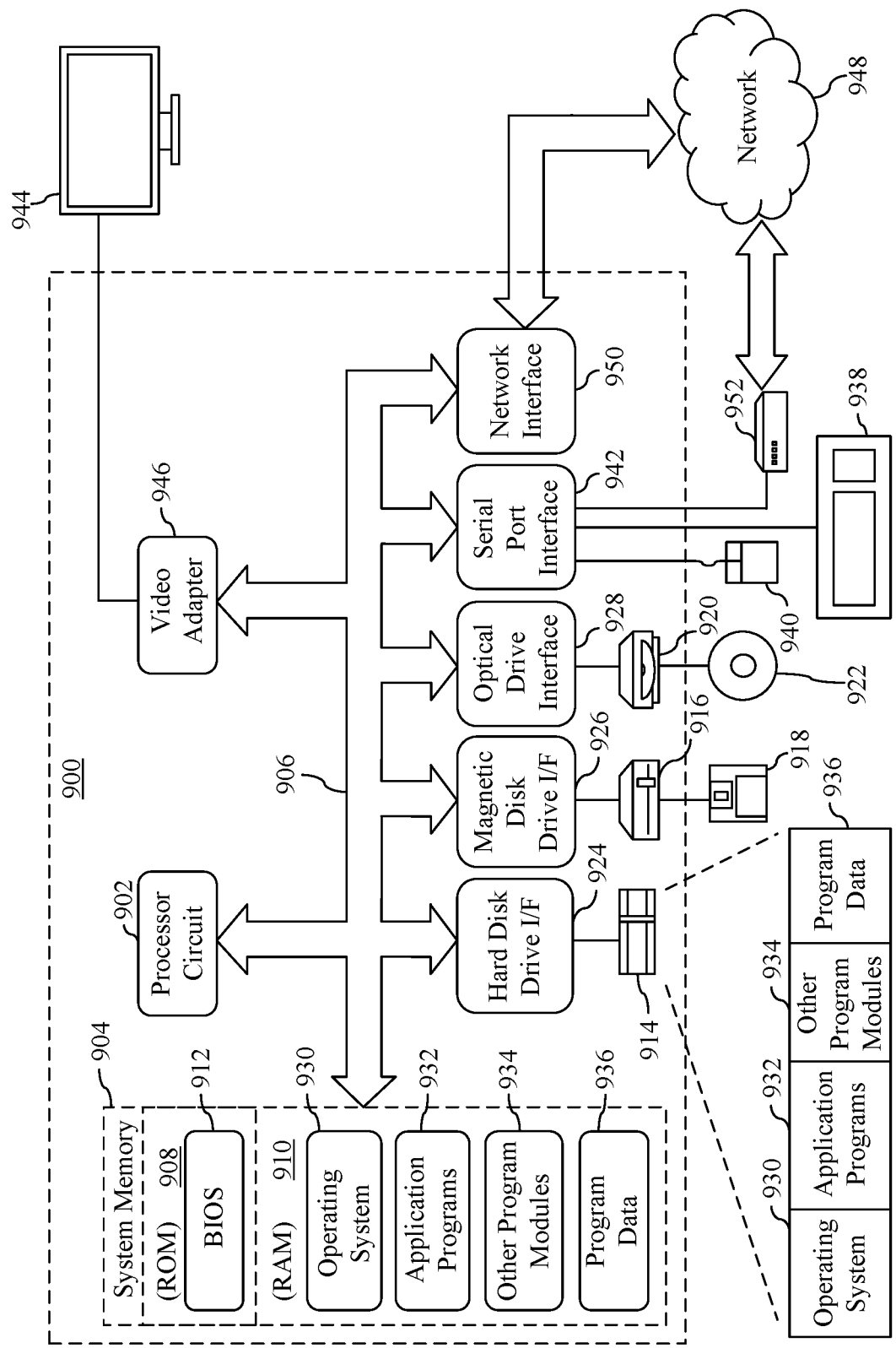
FIG. 9 is a block diagram of an example processor-based computing system that may be used to implement various embodiments.

FIG. 9 depicts an example processor-based computer system 900 that may be used to implement various embodiments described herein, including each of client device 102, resource provider 104, authentication system 506, proxy system 310, primary authentication system 312, backup authentication system 514, authentication artifact signing system 520, the operations of sequence diagram 600 of FIG. 6, the steps of flowchart 700 of FIG. 7 and the steps of flowchart 800 of FIG. 8. The description of system 900 provided herein is provided for purposes of illustration and is not intended to be limiting. Embodiments may be implemented in further types of computer systems, as would be known to persons skilled in the relevant art(s).

As shown in FIG. 9, system 900 includes a processor circuit 902, a system memory 904, and a bus 906 that couples various system components including system memory 904 to processor circuit 902. Processor circuit 902 may comprise one or more microprocessors or microprocessor cores. Bus 906 may represent one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

System 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, BLU-RAY™ disk or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules or components may be stored on the hard disk associated with hard disk drive 914, magnetic disk 918, optical disk 922, ROM 908, or RAM 910. These program modules include an operating system 930, one or more application programs 932, other program modules 934, and program data 936. In accordance with various embodiments, the program modules may include computer program logic that is executable by processor circuit 902 to perform any or all the functions and features of client device 102, resource provider 104, authentication system 506, proxy system 310, primary authentication system 312, backup authentication system 514, authentication artifact signing system 520, the operations of sequence diagram 600 of FIG. 6, the steps of flowchart 700 of FIG. 7 and the steps of flowchart 800 of FIG. 8 as described above.

A user may enter commands and information into system 900 through input devices such as a keyboard 938 and a pointing device 940. Other input devices (not shown) may include a microphone, joystick, game controller, scanner, or the like. In one embodiment, a touch screen is provided in conjunction with a display 944 to allow a user to provide user input via the application of a touch (as by a finger or stylus for example) to one or more points on the touch screen. These and other input devices may be connected to processor circuit 902 through a serial port interface 942 that is coupled to bus 906, but may be connected by other interfaces, such as a parallel port, game port, or a Universal Serial Bus (USB). Such interfaces may be wired or wireless interfaces.

A display 944 is also connected to bus 906 via an interface, such as a video adapter 946. In addition to display 944, system 900 may include other peripheral output devices (not shown) such as speakers and printers.

System 900 is connected to a network 948 (e.g., a local area network or wide area network such as the Internet) through a network interface or adapter 950, a modem 952, or other suitable means for establishing communications over the network. Modem 952, which may be internal or external, is connected to bus 906 via serial port interface 942. As used herein, the terms "computer program medium," "computer-readable medium," and "computer-readable storage medium" are used to generally refer to memory devices or storage structures such as the hard disk associated with hard disk drive 914, removable magnetic disk 918, removable optical disk 922, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media. Embodiments are also directed to such communication media As noted above, computer programs and modules (including application programs 932 and other program modules 934) may be stored on the hard disk of hard disk drive 914, magnetic disk 918, optical disk 922, ROM 908, or RAM 910. Such computer programs may also be received via network interface 950, serial port interface 942, or any other interface type. Such computer programs, when executed or loaded by an application, enable system 900 to implement features of embodiments of the present methods and systems described herein. Accordingly, such computer programs represent controllers of system 900.

Embodiments are also directed to computer program products comprising software stored on any computer useable medium. Such software, when executed in one or more data processing devices, causes a data processing device(s) to operate as described herein. Embodiments of the present methods and systems employ any computer-useable or computer-readable medium, known now or in the future. Examples of computer-readable mediums include but are not limited to memory devices and storage structures such as RAM, hard drives, floppy disks, CD ROMs, DVD ROMs,

IV. Additional Exemplary Embodiments

A system for authenticating a principal is described herein that includes a computer-implemented first authentication system and a computer-implemented authentication artifact signing service. The first authentication system is configured to: store an authentication artifact associated with the principal that was generated by a second authentication system and digitally signed thereby using an encryption key; and generate a request comprising the authentication artifact and a specification of one or more modifications to be made to the authentication artifact. The authentication artifact signing service is configured to receive the request from the first authentication system and, responsive thereto: apply the one or more modifications to the authentication artifact to generate a modified authentication artifact; digitally sign the modified authentication artifact using an encryption key of the second authentication system; and return the digitally signed modified authentication artifact to the first authentication system for use in authenticating the principal.

In one embodiment of the foregoing system, the specification of the one or more modifications to be made to the authentication artifact includes one or more of: a specification of a nonce to be added to the authentication artifact, wherein the nonce originates from a resource provider and is included with an authentication request for the principal received by the backup authentication system; a specification of a new issue time that is to replace an old issue time in the authentication artifact; a specification of a new expiration time that is to replace an old expiration time in the authentication artifact; or a specification of a new Internet Protocol (IP) address associated with the principal that is to replace an old IP address associated with the principal in the authentication artifact.

In another embodiment of the foregoing system, the authentication artifact signing service is further configured to verify that the request originated from the first authentication system.

In yet another embodiment of the foregoing system, the authentication artifact signing service is further configured to verify that the authentication artifact was generated by the second authentication system.

In still another embodiment of the foregoing system, the authentication artifact signing service is further configured to verify that the one or more modifications to be made to the authentication artifact are permissible.

In a further embodiment of the foregoing system, the authentication artifact signing service is further configured to verify a freshness of the authentication artifact.

In a still further embodiment of the foregoing system, the authentication artifact signing service is further configured to verify that the authentication artifact includes an indicator that indicates that the authentication artifact is suitable for modification and re-signing. In further accordance with such an embodiment, the authentication artifact signing service may be further configured to remove the indicator from the authentication artifact when generating the modified authentication artifact.

In another embodiment of the foregoing system, the second authentication system and the authentication artifact signing service both operate in a different security domain than the first authentication system, and the first authentication system does not have access to the encryption keys used to digitally sign the authentication artifact and the modified authentication artifact.

A method performed by a computer-implemented authentication artifact signing service is described herein that includes: receiving from a first authentication system a request comprising an authentication artifact associated with a principal to be authenticated by the first authentication system and a specification of one or more modifications to be made to the authentication artifact, the authentication artifact being generated by a second authentication system, digitally signed thereby using an encryption key, and stored by the first authentication system; applying the one or more modifications to the authentication artifact to generate a modified authentication artifact; digitally signing the modified authentication artifact using an encryption key of the second authentication system; and returning the digitally signed modified authentication artifact to the first authentication system for use in authenticating the principal.

In one embodiment of the foregoing method, the specification of the one or more modifications to be made to the authentication artifact includes one or more of: a specification of a nonce to be added to the authentication artifact, wherein the nonce originates from a resource provider and is included with an authentication request for the principal received by the first authentication system; a specification of a new issue time that is to replace an old issue time in the authentication artifact; a specification of a new expiration time that is to replace an old expiration time in the authentication artifact; or a specification of a new Internet Protocol (IP) address associated with the principal that is to replace an old IP address associated with the principal in the authentication artifact.

In another embodiment of the foregoing method, the method further comprises verifying that the request originated from the first authentication system.

In yet another embodiment of the foregoing method, the method further comprises verifying that the authentication artifact was generated by the second authentication system.

In still another embodiment of the foregoing method, the method further comprises verifying that the one or more modifications to be made to the authentication artifact are permissible.

In a further embodiment of the foregoing method, the method further comprises verifying a freshness of the authentication artifact.

In a still further embodiment of the foregoing method, the method further comprises verifying that the authentication artifact includes an indicator that indicates that the authentication artifact is suitable for modification and re-signing; and removing the indicator from the authentication artifact when generating the modified authentication artifact.

In another embodiment of the foregoing method, the authentication artifact signing service and the second authentication system both operate in a different security domain than the first authentication system, and the first authentication system does not have access to the encryption keys used to digitally sign the authentication artifact and the modified authentication artifact.

A method performed by a computer-implemented first authentication system is also described herein that includes: storing an authentication package associated with a principal and generated by a second authentication system, the authentication package including an authentication artifact and metadata, the authentication artifact being digitally signed by the second authentication system using an encryption key; receiving an authentication request for the principal from a client device; determining, based at least on the metadata, that the authentication request should be granted; and in response to determining that the authentication request should be granted: providing the authentication artifact and a specification of one or more modifications to be made thereto to an authentication artifact signing service; receiving from the authentication artifact signing service a modified version of the authentication artifact that includes the one or more modifications, wherein the modified version of the authentication artifact is digitally signed with an encryption key of the second authentication system; and providing the modified version of the authentication artifact to the client device.

In one embodiment of the foregoing method, the specification of the one or more modifications to be made to the authentication artifact comprises one or more of: a specification of a nonce to be added to the authentication artifact, wherein the nonce originates from a resource provider and is included with the authentication request for the principal; a specification of a new issue time that is to replace an old issue time in the authentication artifact; a specification of a new expiration time that is to replace an old expiration time in the authentication artifact; or a specification of a new Internet Protocol (IP) address associated with the principal that is to replace an old IP address associated with the principal in the authentication artifact.

In another embodiment of the foregoing method, the second authentication system and the authentication artifact signing service both operate in a different security domain than the first authentication system, and the first authentication system does not have access to the encryption keys used to digitally sign the authentication artifact and the modified authentication artifact.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments but should be defined only in accordance with the following claims and their equivalents.

What is claimed is:

1. A system for authenticating a principal, comprising:
a computer-implemented first authentication system configured to:
receive, from a second authentication system, an authentication artifact associated with the principal that was generated by the second authentication system and digitally signed thereby using an encryption key,
store the authentication artifact, and
based on the second authentication system being unavailable and responsive to receiving an authentication request from a client device on behalf of the principal, generate a request comprising the authentication artifact and a specification of one or more modifications to be made to the authentication artifact; and
a computer-implemented authentication artifact signing service configured to receive the request from the first authentication system and, responsive thereto:
apply the one or more modifications to the authentication artifact to generate a modified authentication artifact,
digitally sign the modified authentication artifact using an encryption key of the second authentication system, and
return the digitally signed modified authentication artifact to the first authentication system for use in authenticating the principal.

2. The system of claim 1, wherein the specification of the one or more modifications to be made to the authentication artifact includes one or more of:
a specification of a nonce to be added to the authentication artifact, wherein the nonce originates from a resource provider and is included with an authentication request for the principal received by the first authentication system;
a specification of a new issue time that is to replace an old issue time in the authentication artifact;
a specification of a new expiration time that is to replace an old expiration time in the authentication artifact; or
a specification of a new Internet Protocol (IP) address associated with the principal that is to replace an old IP address associated with the principal in the authentication artifact.

3. The system of claim 1, wherein the authentication artifact signing service is further configured to:
verify that the request originated from the first authentication system.

4. The system of claim 1, wherein the authentication artifact signing service is further configured to:
verify that the authentication artifact was generated by the second authentication system.

5. The system of claim 1, wherein the authentication artifact signing service is further configured to:
verify that the one or more modifications to be made to the authentication artifact are permissible.

6. The system of claim 1, wherein the authentication artifact signing service is further configured to:
verify a freshness of the authentication artifact.

7. The system of claim 1, wherein the authentication artifact signing service is further configured to:
verify that the authentication artifact includes an indicator that indicates that the authentication artifact is suitable for modification and re-signing.

8. The system of claim 7, wherein the authentication artifact signing service is further configured to:
remove the indicator from the authentication artifact when generating the modified authentication artifact.

9. The system of claim 1, wherein the second authentication system and the authentication artifact signing service both operate in a different security domain than the first authentication system, and wherein the first authentication system does not have access to the encryption keys used to digitally sign the authentication artifact and the modified authentication artifact.

10. A method performed by a computer-implemented authentication artifact signing service, comprising:
receiving from a first authentication system a first request comprising an authentication artifact associated with a principal to be authenticated by the first authentication system and a specification of one or more modifications to be made to the authentication artifact, the authentication artifact being generated by a second authentication system, digitally signed thereby using an encryption key, provided to the first authentication system by the second authentication system, and stored by the first authentication system, wherein the first request is generated based on the second authentication system being unavailable and responsive to the first authentication system having received a second request from a client device on behalf of the principal;

applying the one or more modifications to the authentication artifact to generate a modified authentication artifact;

digitally signing the modified authentication artifact using an encryption key of the second authentication system; and returning the digitally signed modified authentication artifact to the first authentication system for use in authenticating the principal.

11. The method of claim 10, wherein the specification of the one or more modifications to be made to the authentication artifact includes one or more of:

a specification of a nonce to be added to the authentication artifact, wherein the nonce originates from a resource provider and is included with an authentication request for the principal received by the first authentication system;

a specification of a new issue time that is to replace an old issue time in the authentication artifact;

a specification of a new expiration time that is to replace an old expiration time in the authentication artifact; or a specification of a new Internet Protocol (IP) address associated with the principal that is to replace an old IP address associated with the principal in the authentication artifact.

12. The method of claim 10, further comprising:
verifying that the request originated from the first authentication system.

13. The method of claim 10, further comprising:
verifying that the authentication artifact was generated by the second authentication system.

14. The method of claim 10, further comprising:
verifying that the one or more modifications to be made to the authentication artifact are permissible.

15. The method of claim 10, further comprising:
verifying a freshness of the authentication artifact.

16. The method of claim 10, further comprising:
verifying that the authentication artifact includes an indicator that indicates that the authentication artifact is suitable for modification and re-signing; and removing the indicator from the authentication artifact when generating the modified authentication artifact.

17. The method of claim 10, wherein the authentication artifact signing service and the second authentication system both operate in a different security domain than the first authentication system, and wherein the first authentication system does not have access to the encryption keys used to digitally sign the authentication artifact and the modified authentication artifact.

18. A computer-readable storage medium having computer program code recorded thereon that when executed by at least one processor causes the at least one processor to perform a method comprising:

receiving from a first authentication system a first request comprising an authentication artifact associated with a principal to be authenticated by the first authentication system and a specification of one or more modifications to be made to the authentication artifact, the authentication artifact being generated by a second authentication system, digitally signed thereby using an encryption key, provided to the first authentication system by the second authentication system, and stored by the first authentication system, wherein the first request is generated based on the second authentication system being unavailable and responsive to the first authentication system having received a second request from a client device on behalf of the principal;

applying the one or more modifications to the authentication artifact to generate a modified authentication artifact;

digitally signing the modified authentication artifact using an encryption key of the second authentication system; and returning the digitally signed modified authentication artifact to the first authentication system for use in authenticating the principal.

19. The computer-readable storage medium of claim 18, wherein the method further comprises:
verifying that the request originated from the first authentication system.

20. The computer-readable storage medium of claim 18, wherein the method further comprises:
verifying that the authentication artifact was generated by the second authentication system.

* * * * *